(12) United States Patent
Urai et al.

(10) Patent No.: US 7,412,329 B2
(45) Date of Patent: Aug. 12, 2008

(54) TRAVEL SAFETY SYSTEM FOR VEHICLE

(75) Inventors: Yoshihiro Urai, Wako (JP); Makoto Otabe, Wako (JP); Kenji Kodaka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/832,451

(22) Filed: Apr. 27, 2004

(65) Prior Publication Data
US 2005/0004760 A1 Jan. 6, 2005

(30) Foreign Application Priority Data
May 9, 2003 (JP) .............................. 2003-131434

(51) Int. Cl.
*G06F 17/10* (2006.01)
*G06G 7/78* (2006.01)
*G08G 1/16* (2006.01)

(52) U.S. Cl. ..................... 701/301; 701/41; 340/435; 340/436; 340/901; 340/903

(58) Field of Classification Search ............... 701/41, 701/301, 302; 340/437, 435–436, 901, 903
See application file for complete search history.

(56) References Cited

U.S. PATENT DOCUMENTS 3,582,933 A * 6/1971 Place ..................... 340/507
5,418,727 A 5/1995 Ikeda et al.
5,540,298 A 7/1996 Yoshioka et al.

(Continued)

FOREIGN PATENT DOCUMENTS

EP 1 300 275 A1 4/2003

(Continued)

OTHER PUBLICATIONS

VALSE—validation of safety-related driver assistance systems; Athanasas, K.; Bonnet, C.; Fritz, H.; Scheidler, C.; Volk, G.; Intelligent Vehicles Symposium, 2003. Proceedings. IEEE, Jun. 9-11, 2003 pp. 610-615; Digital Object Identifier 10.1109/IVS.2003.1212982.*

(Continued)

*Primary Examiner*—Cuong H. Nguyen
(74) *Attorney, Agent, or Firm*—Arent Fox LLP

(57) ABSTRACT

In a travel safety system for a vehicle: a preceding vehicle V1 in a travel direction of a subject vehicle V is detected by a radar device; an overlap amount δ (smaller one of δ(L) and δ(R)), at which the preceding vehicle V1 overlaps a predicted course for the subject vehicle V, is calculated; and when time for which the over lap amount δ exceeding a predetermined value exceeds a predetermined period, it is determined that there is a possibility that the subject vehicle V comes into contact with the preceding vehicle V1, and a safety system comprising a warning or an automatic braking is actuated. Thus, if it is determined that there is a possibility of contact between the subject vehicle V and the preceding vehicle V1 due to course change of the subject vehicle V or the preceding vehicle, it is possible to prevent the safety system from being unnecessarily actuated to provide a sense of discomfort to a driver.

5 Claims, 12 Drawing Sheets

U.S. PATENT DOCUMENTS

| | | | |
|---|---|---|---|
| 5,754,099 A * | 5/1998 | Nishimura et al. | 340/435 |
| 5,940,010 A * | 8/1999 | Sasaki et al. | 340/901 |
| 5,995,037 A | 11/1999 | Matsuda et al. | |
| 6,017,101 A | 1/2000 | Matsuda | |
| 6,021,375 A * | 2/2000 | Urai et al. | 701/301 |
| 6,133,825 A * | 10/2000 | Matsuoka | 340/436 |
| 6,269,307 B1 * | 7/2001 | Shinmura et al. | 701/301 |
| 6,292,721 B1 * | 9/2001 | Conner et al. | 701/9 |
| 6,307,484 B1 * | 10/2001 | Sasaki et al. | 340/903 |
| 6,338,022 B1 * | 1/2002 | Shinmura et al. | 701/301 |
| 6,571,176 B1 * | 5/2003 | Shinmura et al. | 701/301 |
| 6,744,359 B1 * | 6/2004 | Wasilewski et al. | 340/467 |
| 6,771,166 B2 * | 8/2004 | Mastenbrook | 340/425.5 |
| 7,164,350 B2 * | 1/2007 | Ferrone et al. | 340/463 |
| 7,190,260 B2 * | 3/2007 | Rast | 340/479 |
| 7,317,383 B2 * | 1/2008 | Ihara et al. | 340/435 |
| 2003/0090370 A1 * | 5/2003 | Mastenbrook | 340/425.5 |
| 2005/0004760 A1 * | 1/2005 | Urai et al. | 701/301 |
| 2006/0103513 A1 * | 5/2006 | Ihara et al. | 340/435 |
| 2007/0043505 A1 * | 2/2007 | Leicht | 701/301 |
| 2008/0068146 A1 * | 3/2008 | Cauldwell | 340/435 |

FOREIGN PATENT DOCUMENTS

| | | |
|---|---|---|
| JP | 6-227337 A | 8/1994 |
| JP | 7-230600 A | 8/1995 |
| JP | 8-34326 A | 2/1996 |
| JP | 09-311996 A | 12/1997 |
| JP | 10-211886 A | 8/1998 |
| JP | 11-023705 A | 1/1999 |
| JP | 11-139335 A | 5/1999 |
| JP | 11-278095 A | 10/1999 |
| JP | 2000-57496 A | 2/2000 |
| JP | 2000-108860 A | 4/2000 |
| JP | 2002-29404 A | 1/2002 |
| JP | 2002-67904 A | 3/2002 |
| JP | 2002-163797 A | 6/2002 |
| JP | 2002-316601 A | 10/2002 |
| JP | 2003-63274 A | 3/2003 |
| JP | 2003-063430 A | 3/2003 |

OTHER PUBLICATIONS

Probability-based decision making for automated highway driving; Niehaus, A.; Stengel, R.F.; Vehicle Navigation and Information Systems Conference, 1991 vol. 2, Oct. 20-23, 1991 pp. 1125-1136.*

Development of a functional specification for an in-vehicle safety advisory and warning system (IVSAWA); Mayhew, G.L.; Erlichman, J.; Shirley, K.L.; Streff, F.; Vehicle Navigation and Information Systems Conference, 1991; vol. 2, Oct. 20-23, 1991 pp. 1077-1091.*

To brake or not to brake? Is there a question?; Lygeros, J.; Decision and Control, 1996., Proceedings of the 35th IEEE☐☐vol. 4, Dec. 11-13, 1996 pp. 3723-3728 vol. 4; Digital Object Identifier 10.1109/.CDC.1996.577226 ☐☐.*

Deployment of digital vehicle/highway technology for safety enhancement; Fei-Yue Wang; Guanpi Lai; Mirchandani, P.; Intelligent Vehicles Symposium, 2003. Proceedings. IEEE Jun. 9-11, 2003 pp. 204-207; Digital Object Identifier 10.1109/IVS.2003.1212909.*

A new safety warning system based on implementation of digital vehicle/highway technology; Guanpei Lai; Fei-Yue Wang; Intelligent Transportation Systems, 2003. Proceedings. 2003 IEEE vol. 2, Oct. 12-15, 2003 pp. 1776-1779 vol. 2.*

Automatic vehicle monitoring: A life saver; Carter, D.A.; Vehicular Technology Conference, 1980. 30th IEEE, vol. 30, Sep. 15-17, 1980 pp. 387-391.*

Status and future direction of intelligent drive assist technology; Furukawa, Y.; Intelligent Transportation Systems, 2000. Proceedings. 2000 IEEE Oct. 1-3, 2000 pp. 113-118; Digital Object Identifier 10.1109/ITSC.2000.881027.*

VEHIL: developing and testing intelligent vehicles; Verburg, D.J.; van der Knaap, A.C.M.; Ploeg, J.; Intelligent Vehicle Symposium, 2002. IEEE vol. 2, Jun. 17-21, 2002 pp. 537-544 vol. 2.*

A control authority transition system for collision avoidance; Acarman, T.; Yaodong Pan; Ozguner, U.; Intelligent Transportation Systems, 2001. Proceedings. 2001 IEEE Aug. 25-29, 2001 pp. 466-471; Digital Object Identifier; 10.1109/ITSC.2001.948702.*

* cited by examiner

TRAVEL SAFETY SYSTEM FOR VEHICLE

BACKGROUND OF THE INVENTION

1. Field of the Invention

The present invention relates to a travel safety system for a vehicle, which is designed so that an object is detected by an object detecting means mounted on the vehicle, and when there is a possibility that the vehicle comes into contact with the object, the safety system is actuated to avoid the contact.

2. Description of the Related Art

Japanese Patent Application Laid-open No. 11-23705 discloses a conventional travel safety system, in which an object existing in a travel direction of a subject vehicle is detected by a radar device, the presence or absence of a possibility of contact between the subject vehicle and the object is determined based on an overlap amount (an avoiding steerage amount) in a vehicle-width direction, and when it is determined that there is the possibility of contact, a warning or an automatic braking is carried out to avoid the contact of the subject vehicle with the object.

However, in the conventional travel safety system, in such a case where the subject vehicle or a preceding vehicle has changed its course to traverse a traffic lane, if the preceding vehicle temporarily traverses the course of the subject vehicle to generate an overlap amount in a vehicle-width direction, it is determined that there is a possibility that the subject vehicle comes into contact with the preceding vehicle, leading to a possibility that the warning or the automatic braking is carried out. If the overlap amount is generated just for a moment in this way, then the warning or the automatic braking is carried out although the possibility of contact is actually low, resulting in a problem that a driver feels a sense of discomfort or vexation.

SUMMARY OF THE INVENTION

Accordingly, it is an object of the present invention to prevent a safety system from being unnecessarily actuated, when an overlap amount in a vehicle-width direction between a subject vehicle and a preceding vehicle is temporarily generated.

To achieve the above object, according to a first feature of the present invention, there is provided a travel safety system for a vehicle, comprising: an object detecting means for detecting an object existing in a travel direction of the vehicle; a correlation calculating means for calculating a correlation including a relative position of the object to the vehicle based on a result of the detection by the object detecting means; and a safety system operation control means for determining presence or absence of possibility of contact between the vehicle and the object based on the correlation calculated by the correlation calculating means, and controlling the operation of the safety system, wherein, when there is the possibility of contact, the safety system operation control means controls the safety system based on a duration of time for which the object exists in a predetermined region where there is the possibility of contact with the vehicle.

With the above-described arrangement, the operation of the safety system for avoiding the contact of the vehicle with the object existing in the travel direction of the vehicle is controlled based on the time for which the object existing in the travel direction of the vehicle exists in the predetermined region where there is the possibility of contact with the vehicle. Therefore, when it has been determined that there is temporarily the possibility of contact with the object due to the course change of the vehicle or the movement of the object, it is possible to prevent the safety system from being unnecessarily actuated to provide a sense of discomfort to the driver.

According to a second feature of the present invention, in addition to the first feature, the safety system further includes a course predicting means for predicting a future course of the vehicle based on a motional state of the vehicle; wherein the correlation calculating means calculates an overlap amount in a vehicle-width direction in which the object situates in the predicted course; and wherein the safety system operation control means construes that the object exists in the predetermined region, when the overlap amount is equal to or larger than a predetermined value.

With the above-described arrangement, the overlap amount in a vehicle-width direction of the object situating in the course predicted based on the motional state of the vehicle is calculated, and when the overlap amount is equal to or larger than the predetermined value, it is construed that the object exists in the predetermined region where there is the possibility of contact. Therefore, the possibility of contact between the subject vehicle and the object can be properly determined.

According to a third feature of the present invention, in addition to the first or second feature, the safety system is any of a warning means for the driver of the vehicle, a decelerating means for the vehicle and a steering means for the vehicle.

With the above-described arrangement, the safety system is comprised of any of the warning means for the driver of the vehicle, the decelerating means for the vehicle and the steering means for the vehicle. Therefore, it is possible to emit a warning to the driver to urge the driver for steering operation or braking operation, to automatically decelerate the vehicle, or to automatically steer the vehicle, thereby avoiding the contact with the object.

According to a fourth feature of the present invention, in addition to the third feature, the safety system operation control actuates the safety system when the duration of time for which the object exists in a predetermined region where there is the possibility of contact with the vehicle is equal to or greater than a predetermined period.

With the above-described feature, when the time for which the overlap amount of the object situating in the predicted course of the vehicle is equal to or larger than the predetermined value is equal to or larger than the predetermined period, the safety system is actuated. Therefore, it is possible to correctly determine the presence or absence of the possibility of contact to appropriately actuate the safety system.

According to a fifth feature of the present invention, in addition to the fourth feature, the warning means comprises a primary warning means, and a secondary warning means which is adapted to be actuated when there is a possibility of contact higher than that for the operation of the primary warning means, and the predetermined period is set such that the predetermined period for the operation of the primary warning means is longer than that for the operation of the secondary warning means.

With the above-described arrangement, the predetermined period for operating the safety system is set such that the predetermined period for the operation of the primary warning means when the possibility of contact is relatively low is longer than that for the operation of the secondary warning means when the possibility of contact is relatively high. Therefore, it is possible to prevent the primary warning means from being frequently actuated to give the driver vexation, and to immediately actuate the secondary warning means when an object break into a space just in front of the subject vehicle, thereby providing an enhancement in safety.

According to a sixth feature of the present invention, in addition to the fourth feature, the decelerating means comprises a primary decelerating means, and a secondary decelerating means which is adapted to be actuated when there is a possibility of contact higher than that for the operation of the primary decelerating means, and the predetermined period is set such that the predetermined period for the operation of the secondary decelerating means is longer than that for the operation of the primary decelerating means.

With the above-described arrangement, the predetermined period for operating the safety system is set such that the predetermined period for the operation of the secondary decelerating means when the possibility of contact is relatively high, is longer than that for the operation of the primary decelerating means when the possibility of contact is relatively low. Therefore, it is possible to prevent an excessive actuation of the secondary decelerating means which generates a stronger decelerating force, thereby providing an enhancement in reliability.

According to a seventh feature of the present invention, in addition to the fourth feature, the steering means comprises a primary steering means, and a secondary steering means which is adapted to be actuated when there is a possibility of contact higher than that for the operation of the primary steering means, and the predetermined period is set such that the predetermined period for the operation of the secondary steering means is longer than that for the operation of the primary steering means.

With the above-described arrangement, the predetermined period for operating the safety system is set such that the predetermined period for the operation of the secondary steering means when the possibility of contact is relatively high, is longer than that for the operation of the primary steering means when the possibility of contact is relatively low. Therefore, it is possible to prevent an excessive actuation of the secondary steering means which generates a stronger steering torque, thereby providing an enhancement in reliability.

An electronically controlled vacuum booster 2 and a hydraulic pressure control device 4 in an embodiment correspond to the decelerating means of the present invention; a preceding vehicle V1 in the embodiment corresponds to the object of the present invention; and a radar device Sa in the embodiment corresponds to the object detecting means of the present invention.

The above and other objects, features and advantages of the invention will become apparent from the following description of the preferred embodiment taken in conjunction with the accompanying drawings.

BRIEF DESCRIPTION OF THE DRAWINGS

FIGS. 1 to 5 show an embodiment of the present invention; wherein

FIG. 1 is an illustration showing the entire arrangement of a vehicle provided with a travel safety system according to the embodiment;

FIG. 2 is a block diagram of a braking system of the vehicle;

FIG. 3 is a block diagram of a control system for the travel safety system;

FIG. 4 is a diagram for explaining an overlap amount; and

FIG. 5 is a map for searching an avoiding time from the overlap amount.

FIGS. 6 to 8 show a first reference example, wherein

FIG. 6 is a block diagram of a control system for a travel safety system according to the first reference example;

FIG. 7 is a diagram for explaining an avoiding steerage amount when one preceding vehicle exists; and FIG. 8 is a diagram for explaining an avoiding steerage amount when two preceding vehicles exist.

FIGS. 9 to 12 show a second reference example, wherein

FIG. 9 is an illustration showing the entire arrangement of a vehicle provided with a travel safety system according to the second reference example;

FIG. 10 is a block diagram of a braking system of the vehicle;

FIG. 11 is a block diagram of a control system for the travel safety system; and FIG. 12 is a flow chart for determining whether the travel safety system is normal or abnormal.

DESCRIPTION OF THE PREFERRED EMBODIMENT

An embodiment of the present invention will now be described with reference to FIGS. 1 to 5.

Figure 1:
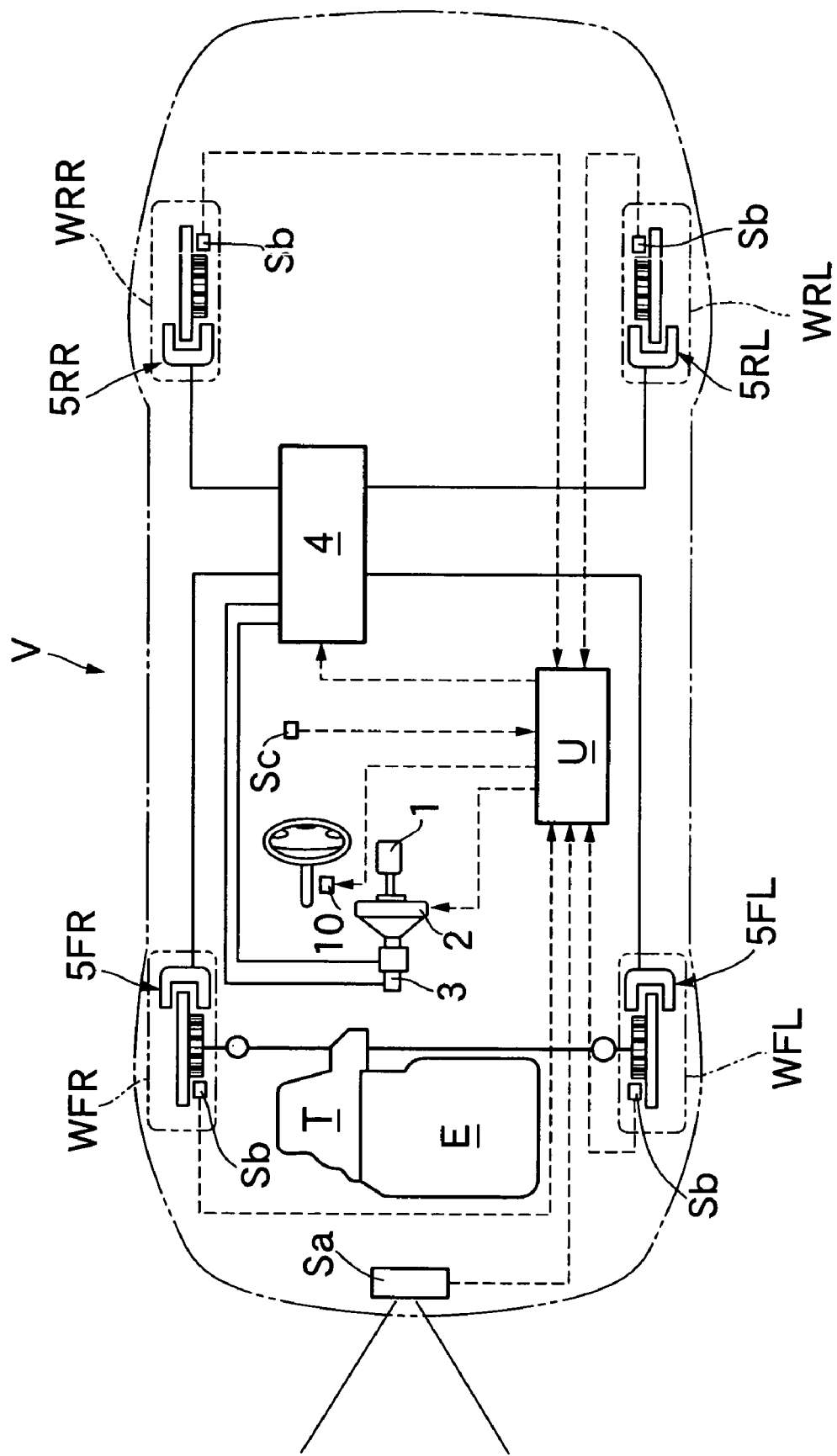
Figure 2:
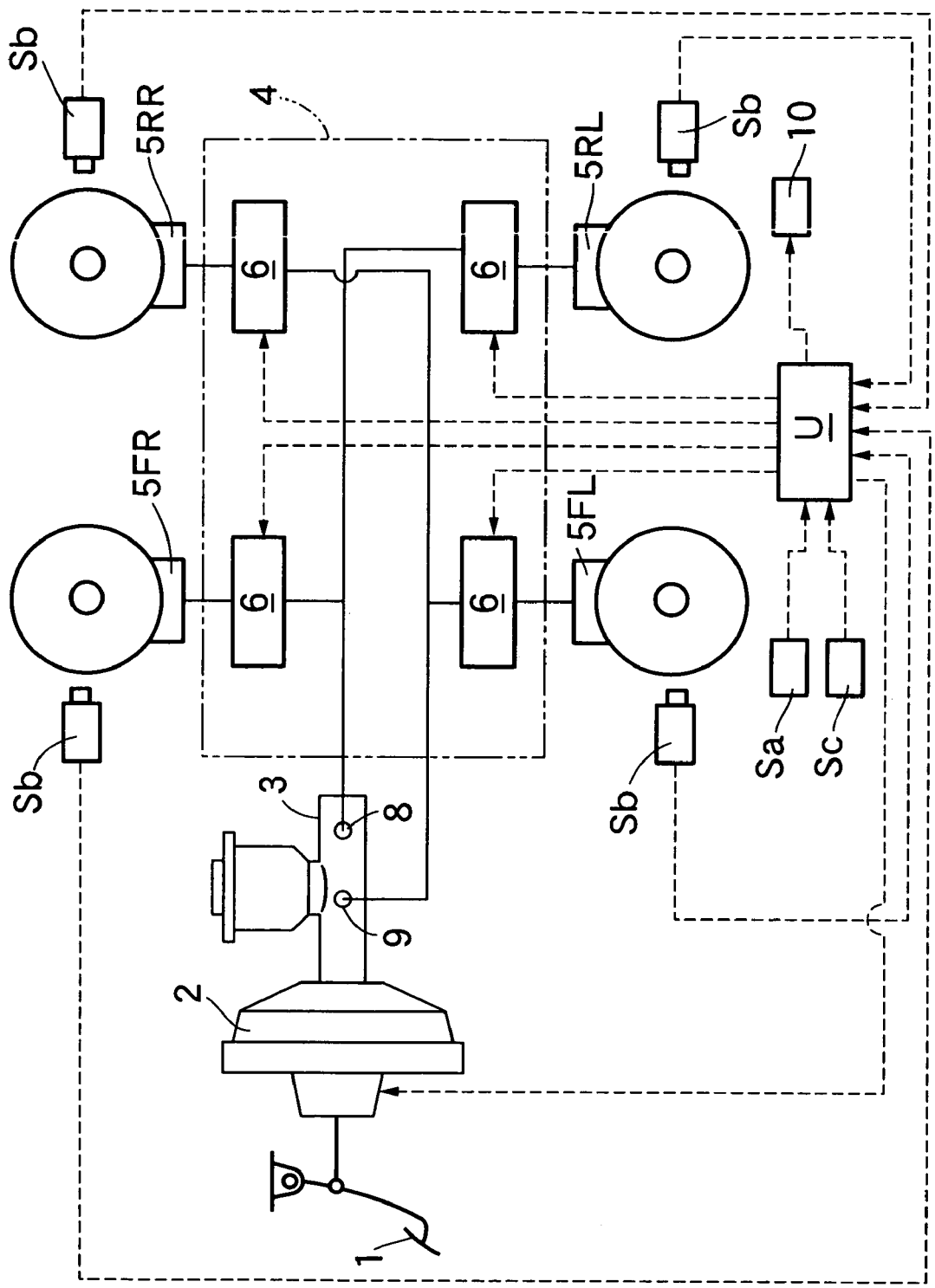

As shown in FIGS. 1 and 2; a four-wheel vehicle (subject vehicle) V provided with a travel safety system according to the present embodiment includes left and right front wheels WFL and WFR as driven wheels to which a driving force of an engine E is transmitted through a transmission T, and left and right rear wheels WRL and WRR as follower wheels which are rotated with the traveling of the vehicle V. A brake pedal 1 operated by a driver is connected to a master cylinder 3 through an electronically controlled vacuum booster 2. The electronically controlled vacuum booster 2 is adapted to mechanically boost a depression force on the brake pedal 1 to actuate the master cylinder 3, and to actuate the master cylinder 3 by a braking command signal from an electronic control unit U during automatic braking without the operation of the brake pedal 1. When the depression force is applied to the brake pedal 1 and the braking command signal is input from the electronic control unit U, the electronically controlled vacuum booster 2 outputs a braking hydraulic pressure in accordance with smaller one of the depression force and the braking command signal. An input rod of the electronically controlled vacuum booster 2 is connected to the brake pedal 1 through a lost motion mechanism, so that even if the electronically controlled vacuum booster 2 is actuated by a signal from the electronic control unit U to move the input rod forwards, the brake pedal 1 remains at an initial position.

A pair of output ports 8 and 9 in the master cylinder 3 are connected through a hydraulic pressure control device 4 to brake calipers 5FL, 5FR, 5RL and 5RR mounted respectively on the front wheels WFL and WFR and the rear wheels WRL and WRR. The hydraulic pressure control device 4 includes four pressure regulators 6 in correspondence to the four brake calipers 5FL, 5FR, 5RL and 5RR. The pressure regulators 6 are connected to the electronic control unit U to individually control the brake calipers 5FL, 5FR, 5RL and 5RR mounted on the front wheels WFL and WFR and the rear wheels WRL and WRR.

Connected to the electronic control unit U are a radar device Sa as an object detecting means comprising a laser radar device or a millimeter wave radar device, vehicle speed sensors Sb for detecting a vehicle speed based on wheel speeds, a yaw rate sensor Sc for detecting a yaw rate of the vehicle V, and a warning means 10 comprising a speaker.

Thus, the electronic control unit U controls the operations of the warning means 10, the electronically controlled vacuum booster 2 and the hydraulic pressure control device 4, based on outputs from the radar device Sa, the vehicle speed sensors Sb and the yaw rate sensor Sc. More specifically, when the warning means 10 is operated by a command from the electronic control unit U, a warning is given to the driver by a warning sound or a voice. When the electronically controlled vacuum booster 2 is operated By a command from the electronic control unit U, the braking hydraulic pressure generated by the master cylinder 3 is regulated by the hydraulic pressure control device 4 and transmitted to the brake calipers 5FL, 5FR, 5RL and 5RR, whereby braking forces for the front wheels WFL and WFR and the rear wheels WRL and WRR are controlled independently from one another.

Figure 3:
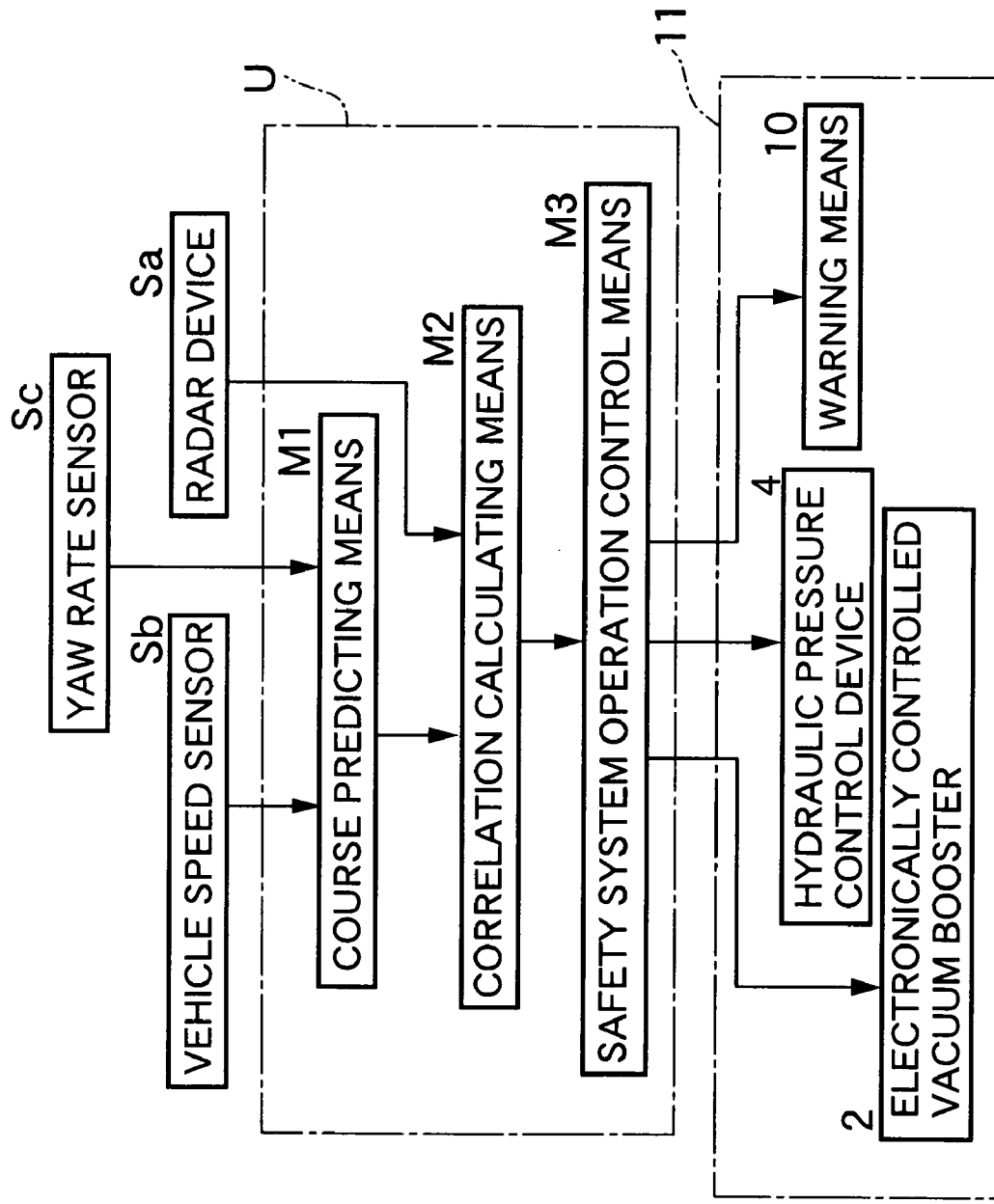
Figure 4:
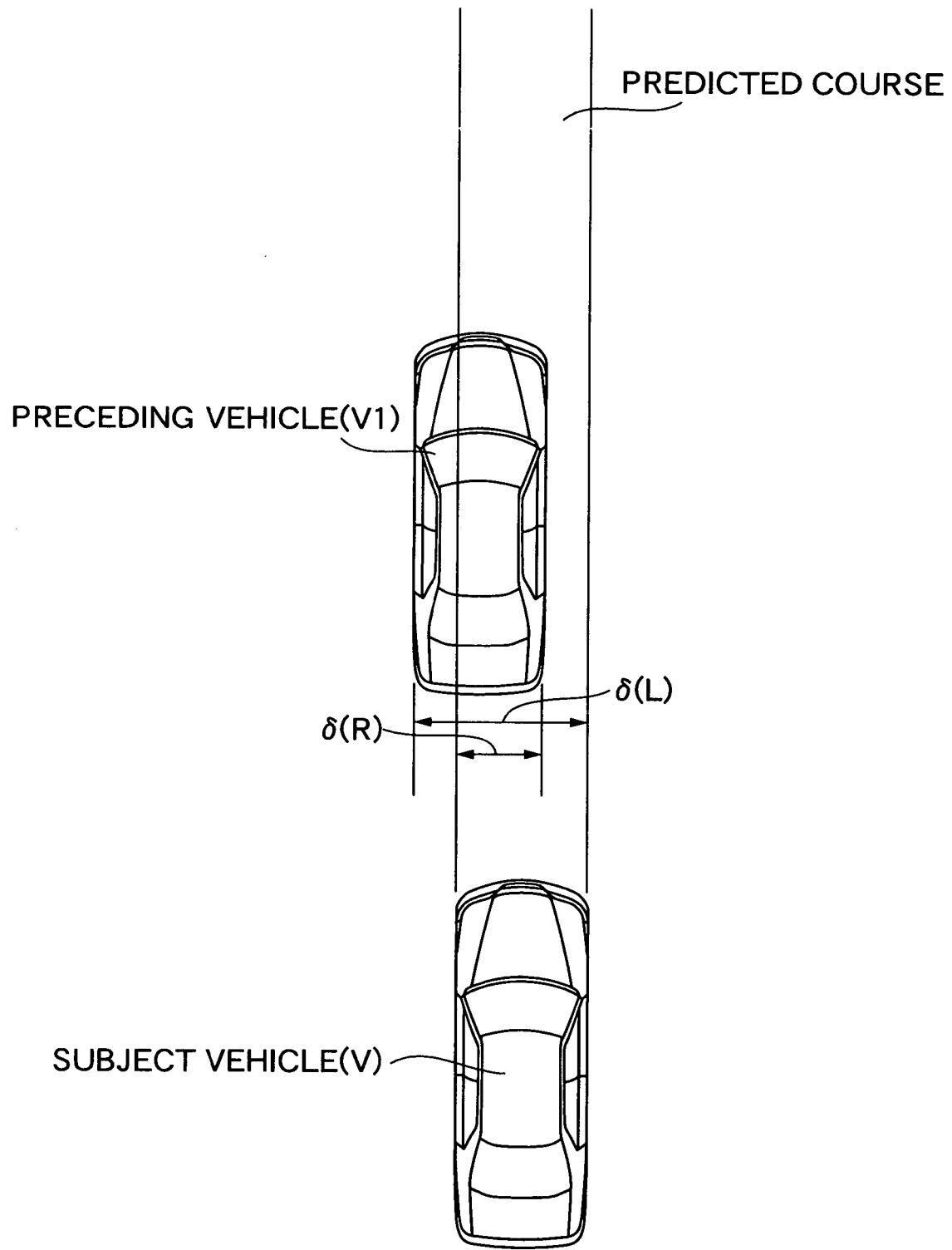

As shown in FIG. 3, the electronic control unit U is provided with a course predicting means M1, a correlation calculating means M2 and a safety system operation control means M3. The vehicle speed sensors Sb and the yaw rate sensor Sc are connected to the course predicting means M1. The course predicting means M1 and the radar device Sa are connected to the correlation calculating means M2. The warning means 10, the electronically controlled vacuum booster 2 and the hydraulic pressure control device 4 which constitute the safety system 11 of the present invention, are connected to the safety system operation control means M3.

The operation of the embodiment having the above-described arrangement will be described below.

The course predicting means M1 of the electronic control unit U predicts a future course of the subject vehicle V, based on a vehicle speed detected by the vehicle speed sensors Sb and a yaw rate of the subject vehicle V detected by the yaw rate sensor Sc. A predicted course of the subject vehicle V during straight traveling of the vehicle is shown in a band-shape in FIG. 4, wherein the width of the predicted course corresponds to a width of the vehicle V. A predicted course during rightward turning of the vehicle V is curved rightwards, and a predicted course during leftward turning of the vehicle V is curved leftwards. The curvature is larger as the yaw rate is larger and as the vehicle speed is smaller.

The correlation calculating means M2 calculates a relative position (a direction and a relative distance) and a relative speed of an object such as a preceding vehicle V1 existing in a travel direction of the subject vehicle V, based on an output from the radar device Sa. If the radar device Sa is a millimeter radar device, the relative speed of the object can be immediately determined, and if the radar device Sa is a laser radar device, the relative speed of the object can be determined as a rate of change with time in the relative distance of the object.

Further, the correlation calculating means M2 calculates an avoiding steerage amount (an overlap amount) δ by superimposing the relative position of the detected object (the preceding vehicle V1) on the predicted course of the subject vehicle V. As can be seen from FIG. 4, in order to allow the subject vehicle V to perform a rightward avoiding motion to avoid the contact with preceding vehicle V1, an avoiding steerage amount (an overlap amount) δ(R) is required, and in order to allow the subject vehicle V to perform a leftward avoiding motion to avoid the contact with preceding vehicle V1, an avoiding steerage amount (an overlap amount) δ(L) is required. In an example shown in FIG. 4, the preceding vehicle V1 is displaced leftwards with respect to a centerline of the predicted course of the subject vehicle V, and hence the contact with the preceding vehicle V1 can be avoided more easily by conducting the rightward avoiding motion. Therefore, a rightward avoiding amount δ(R) to easily avoid the contact, namely, a smaller avoiding amount δ(R) is selected as an avoiding steerage amount (overlap amount) δ.

Figure 5:
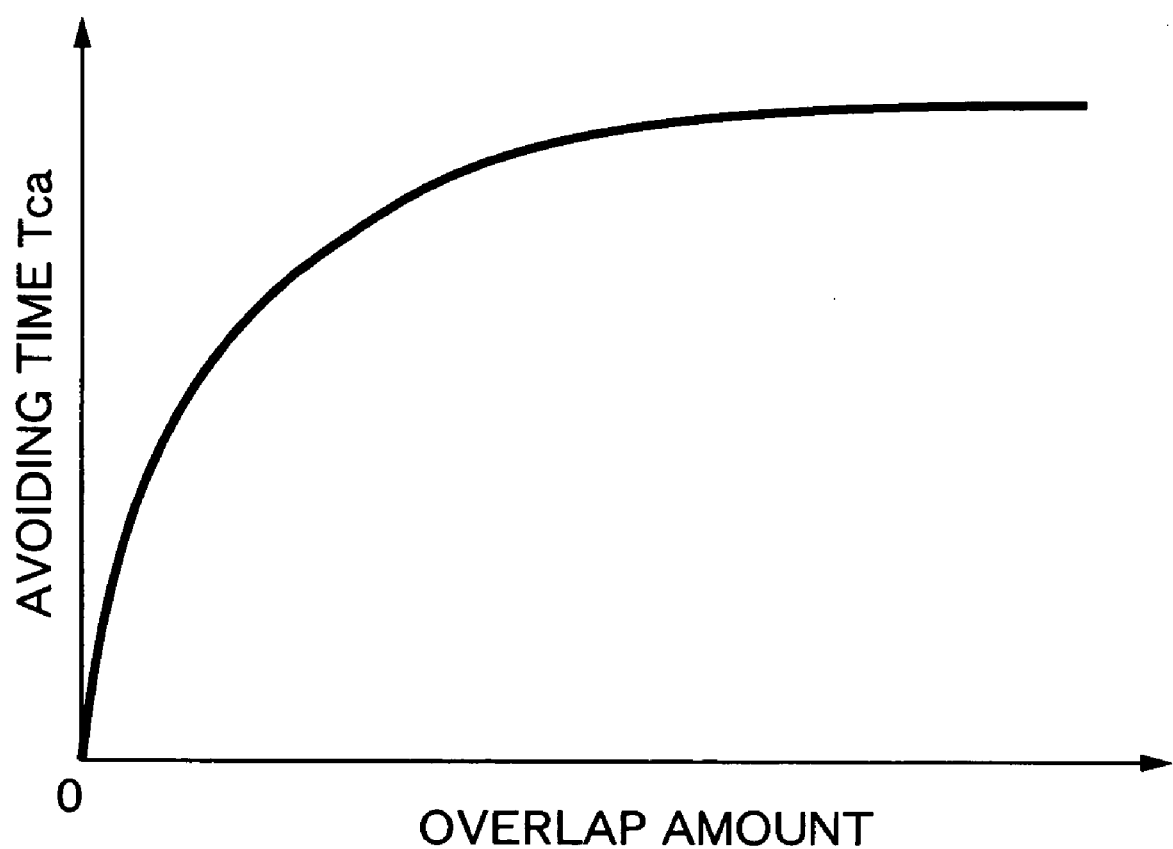

When the overlap amount δ has been calculated in the above-described manner by the correlation calculating means M2, the safety system operation control means M3 searches an avoiding time Tca, based on a map shown in FIG. 5 and established in advance in correspondence to a vehicle speed, a vehicle performance, a road surface friction coefficient and the like. The avoiding time Tca corresponds to time required for avoiding the contact with the preceding vehicle V1, and is set so that the inclination of the avoiding time Tca is larger in a region where the overlap amount δ is smaller, and the inclination of the avoiding time Tca is smaller in a region where the overlap amount δ is larger.

The safety system operation control means M3 counts up a lap time Tlap which is time lapsed after the generation of the overlap amount δ. The lap time Tlap is reset to 0 when the overlap amount δ becomes 0, and the counting-up is restarted when another overlap amount δ is generated.

The safety system operation control means M3 also calculates a primary warning timing Tw1, a secondary warning timing Tw2, a primary braking timing Tb1 and a secondary braking timing Tb2 by adding margin times dTw1, dTw2, dTb1 and dTb2 to the avoiding time Tca.

$$Tw1 = Tca + dTw1$$

$$Tw2 = Tca + dTw2$$

$$Tb1 = Tca + dTb1$$

$$Tb2 = Tca + dTb2$$

The lengths of the four margin times dTw1, dTw2, dTb1 and dTb2 to be dTw1>dTw2>dTb1>dTb2. As a result, the lengths of the four timings are set to be Tw1>Tw2>Tb1>Tb2. Therefore, the control is carried out in an order of a primary warning→a secondary warning→a primary braking→a secondary braking, that is, from the longer timing operation (with a lower emergency degree) to the shorter timing operation (with a higher emergency degree).

Then, a primary warning distance Dw1, a secondary warning distance Dw2, a primary braking distance Db1 and a secondary braking distance Db2 are calculated by multiplying the primary warning timing Tw1, the secondary warning timing Tw2, the primary braking timing Tb1 and the secondary braking timing Tb2 by a relative speed ΔV between the subject vehicle V and the preceding vehicle V1.

$$Dw1 = Tw1 \times \Delta V$$

$$Dw2 = Tw2 \times \Delta V$$

$$Db1 = Tb1 \times \Delta V$$

$$Db2 = Tb2 \times \Delta V$$

In calculating the primary warning distance Dw1, the secondary warning distance Dw2, the primary braking distance Db1 and the secondary braking distance Db2, it is possible to take accelerations and decelerations of the subject vehicle V and the preceding vehicle V1 into consideration and to add a predetermined margin distance to the value obtained by multiplying the primary warning timing Tw1, the secondary warning timing Tw2, the primary braking timing Tb1 and the secondary braking timing Tb2 by the relative speed ΔV.

Subsequently, a primary warning-permission lap time $Tav\_{_w}1$ and a secondary warning-permission lap time $Tav\_{_w}2$ are set so as to have the following relation:

$$Tav\_W1 > Tav\_w2$$

and a primary braking-permission tap time $Tav\_{_b}1$ and a secondary braking-permission lap time $Tav\_{_b}2$ are set so as to have the following relation:

$$Tav\_b1 < Tav\_{_b}2$$

When the relative distance D between the subject vehicle V and the preceding vehicle V1 is smaller than each of the distances Dw1, Dw2, Db1 and Db2, and the lap time Tlap is equal to or larger than each of the lap times Tav_w1, Tav_w2, Tav_b1 and Tav_b2, it is determined that there is a high possibility that the subject vehicle V comes into contact with the preceding vehicle V1, whereby the control operations for the primary warning, the secondary warning, the primary braking and the secondary braking are carried out.

Specifically, if relations, D<Dw1 and Tlap≧Tav_w1 are established, the warning means 10 emits one set of successive five shots of single sound (peep, peep, peep, peep, peep) as the primary warning, and if the conditions for the primary warning still remain after four seconds has passed thereafter, such a warning is repeated. The primary warning is canceled when the secondary warning, the primary braking or the braking is carried out.

If relations, $$D<Dw2 \text{ and } Tlap \geq Tav\_w2$$

are established, then the warning means 10 emits a continuous sound (peep) as the secondary warning. This secondary warning is being continued even during operation of the primary braking or the secondary braking.

In this way, when there is a possibility that the subject vehicle V comes into contact with the preceding vehicle V1, it is possible to urge the driver for the steering operation or the braking operation to avoid the contact by the primary warning or the secondary warning from the warning means 10 depending on the magnitude of the possibility of contact.

By setting the primary warning-permission lap time Tav_w1 longer than the secondary warning-permission lap time Tav_w2, it is possible to prevent the driver from feeling vexation with frequent actuation of the warning means 10, and the shorter secondary warning-permission lap time Tav_w2 ensures that if the preceding vehicle V1 breaks into the immediate vicinity of the subject vehicle, then the warning means 10 can be immediately actuated to enhance the safety.

Further, if relations, $$D<Db1 \text{ and } Tlap \geq Tav\_b1$$

are established, then the electronically controlled vacuum booster 2 and the hydraulic pressure control device 4 are actuated to generate a braking force of, for example, 0.2 G for the primary braking, and if relations, $$D<Db2 \text{ and } Tlap \geq Tav\_b2$$

are established, then the electronically controlled vacuum booster 2 and the hydraulic pressure control device 4 are actuated to generate a braking force of, for example, 0.6 G for the secondary braking.

If there is still a possibility that the subject vehicle V comes into contact with the preceding vehicle V1 although the warning means 10 has been actuated to emit the warning to the driver, it is possible to effectively prevent the subject vehicle V from coming into contact with the preceding vehicle V1 by effecting the primary braking or the secondary braking with a braking force corresponding to the magnitude of the possibility of contact.

By setting the secondary braking-permission lap time Tav_b2 longer than the primary braking-permission lap time Tav_b1, it is possible to prevent an excessive operation of the secondary braking control which generates a stronger braking force, leading to an enhancement in reliability.

As described above, the lap time Tlap which is time lapsed after the generation of the overlap amount 6 is compared with the lap times Tav_w1, Tav_w2, Tav_b1 and Tav_b2 set in correspondence to the emergency degree for the avoidance of the contact, and the safety system 11 is actuated based on the result of the comparison. Therefore, in such a case where the subject vehicle V or the preceding vehicle V1 changes the course to temporarily generate an overlap amount δ but the overlap amount δ vanishes in a short time to eliminate the possibility of contact, it is possible to prevent the safety system 11 from being unnecessarily actuated to provide a sense of discomfort to the drive.

Although the embodiment of the present invention has been described in detail, it will be understood that various modifications in design may be made without departing from the subject matter of the invention.

For example, the automatic braking by the safety system 11 is not limited to the hydraulic braking in the embodiment and may be an engine brake. In this case, the transmission T can be downshifted by one stage in the primary braking, and can be downshifted by two stages in the secondary braking.

A steering means such as a power steering device may be also employed as the safety system. In this case, it is possible to generate through a primary steering a weak steering torque in a direction to avoid the contact, and to generate through a secondary steering a strong steering torque in a direction to avoid the contact. At this time, if a secondary steering-permitting lap time Tav_s2 is set longer than a primary steering-permitting lap time Tav_s1, it is possible to prevent an excessive operation of a secondary steering control which generates a stronger steering torque, leading to an enhancement in reliability.

The warning means 10 of the safety system 11 is not limited to the speaker in the embodiment, and any means such as a buzzer, a chime, a lamp and LED can be employed.

In the embodiment, when the overlap amount 6 is equal to or larger than 0, the preceding vehicle V1 is construed as existing in a predetermined region, but the overlap amount δ can be set at any value other than 0.

The object in the present invention is not limited to the preceding vehicle V1 and may be a vehicle traveling in the opposite direction, a fixed object beside a road, a dropped object on a road or the like.

A first reference example will be described below with reference to FIGS. 6 and 8.

Figure 6:
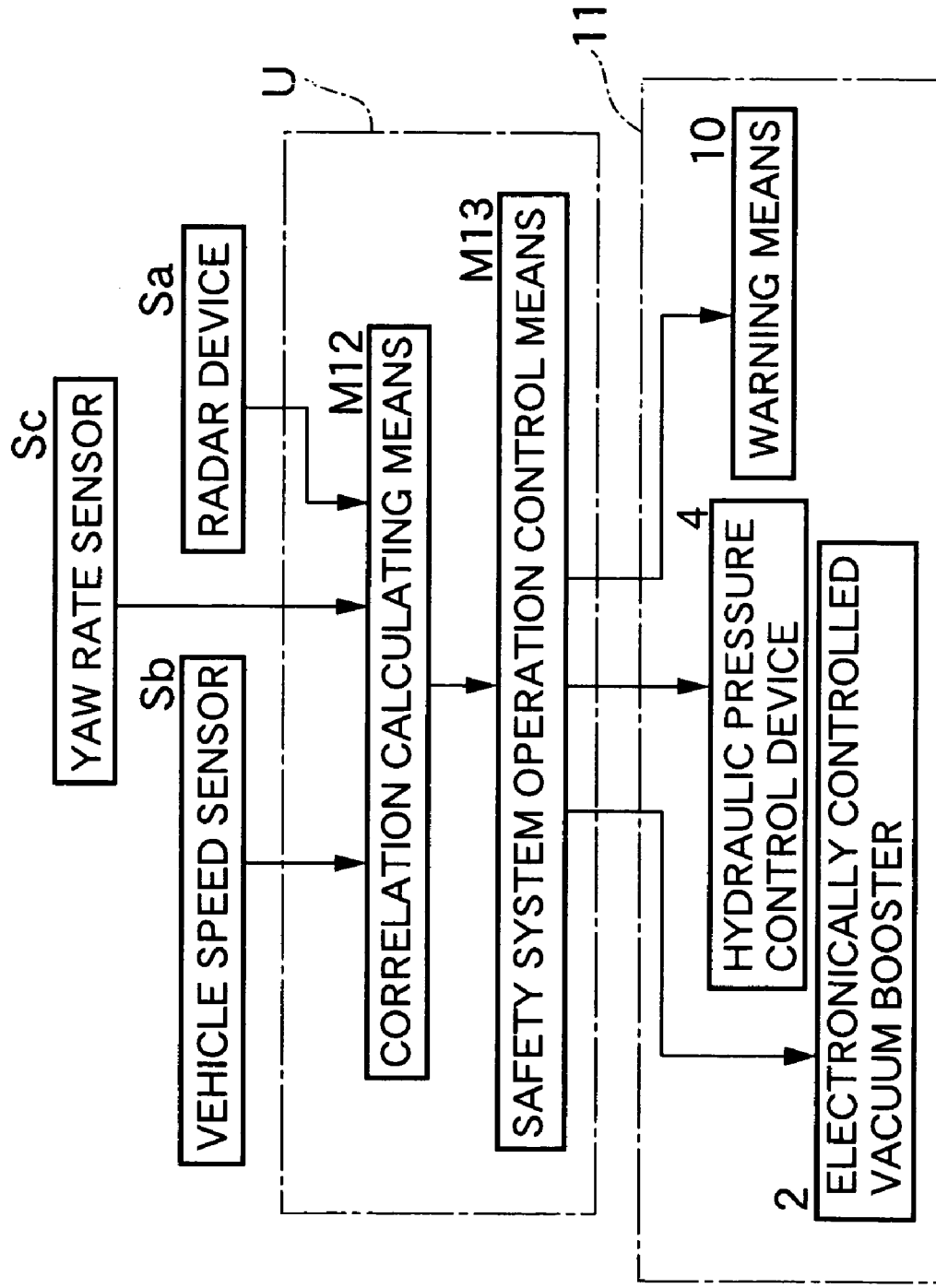

As shown in FIG. 6, an electronic control unit U is provided with a correlation calculating means M11 and a safety system operation control means M12. A radar device Sa, vehicle speed sensors Sb and a yaw rate sensor Sc are connected to the correlation calculating means M11, and a warning means 10, an electronically controlled vacuum booster 2 and a hydraulic control device 4, which constitute a safety system 11, are connected to the safety system operation control means M12. The arrangement of the other components is the same as that in the above-described embodiment.

The operation of the first reference example having the above-described arrangement will be described below.

The correlation calculating means M11 of the electronic control unit U calculates a relative position (a direction and a relative distance) and a relative speed of an object such as a preceding vehicle V1 existing in a travel direction of the subject vehicle V, based on an output from the radar device Sa. If the radar device Sa is a millimeter radar device, the relative speed of the object can be immediately determined, and if the radar device Sa is a laser radar device, the relative speed of the object can be determined as a rate of change with time in the relative distance of the object.

The correlation calculating means M11 predicts a future course of the subject vehicle V, based on a vehicle speed detected by the vehicle speed sensors Sb and a yaw rate of the subject vehicle V detected by the yaw rate sensor Sc. A predicted course of the subject vehicle V during straight traveling of the vehicle is shown in a band-shape in FIG. 8, wherein the width of the predicted course corresponds to a width of the vehicle V. A predicted course during rightward turning of the vehicle is curved rightwards, and a predicted course during leftward turning of the vehicle is curved leftwards. The curvature is larger as the yaw rate is larger and as the vehicle speed is smaller.

Further, the correlation calculating means M11 calculates an avoiding steerage amount δ by superimposing the relative position of the detected object (the preceding vehicle V1) on the predicted course of the subject vehicle V. As can be seen from FIG. 8, in order to allow the subject vehicle V to perform a rightward avoiding motion to avoid the contact with preceding vehicle, an avoiding steerage amount δ(R) is required, and in order to allow the subject vehicle V to perform a leftward avoiding motion to avoid the contact with preceding vehicle, an avoiding steerage amount δ(L) is required. In an example shown in FIG. 8, the preceding vehicle is displaced leftwards with respect to a centerline of the predicted course of the subject vehicle V, and hence the contact with the preceding vehicle can be avoided more easily by conducting the rightward avoiding motion. Therefore, a rightward avoiding amount δ(R) enough to easily avoid the contact, namely, a smaller avoiding amount δ(R) is selected as an avoiding steerage amount δ.

Figure 7:
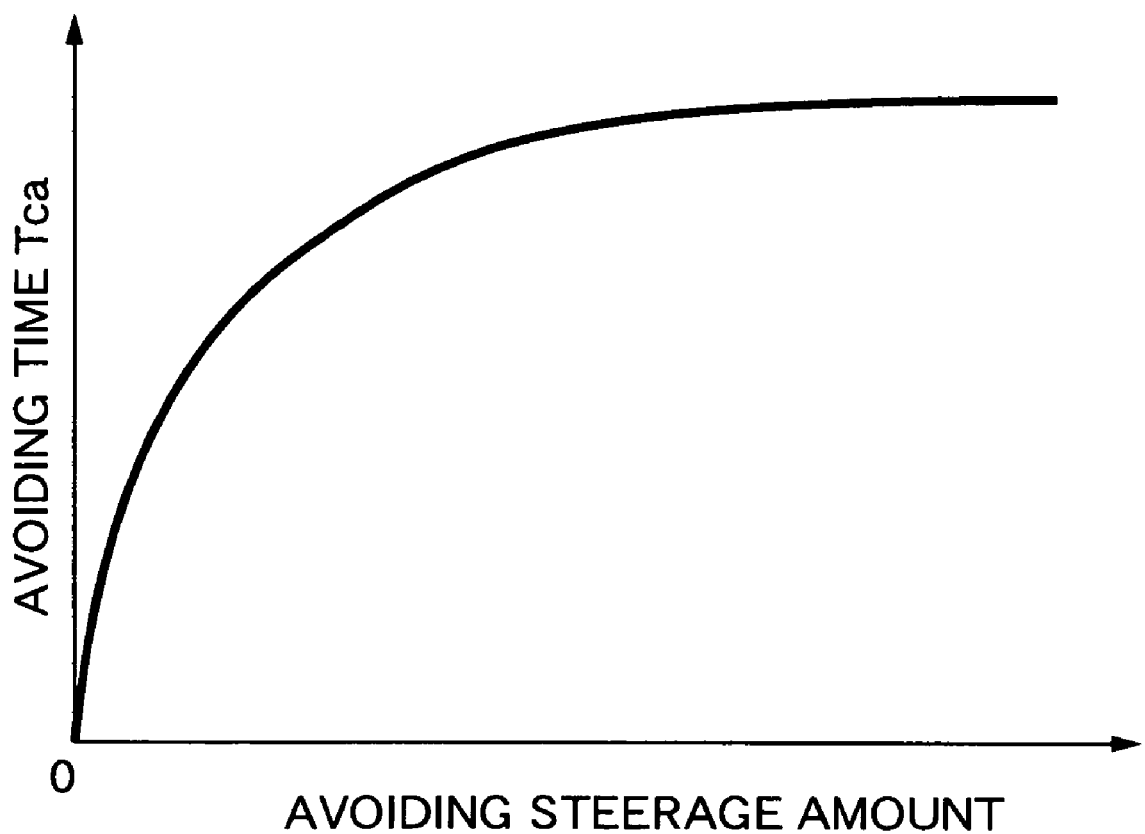

When the avoiding steerage amount δ has been calculated in the above-described manner by the correlation calculating means M11, the safety system operation control means M12 searches an avoiding time Tca, based on a map shown in FIG. 7 and established in advance in correspondence to a vehicle speed, a vehicle performance, a road surface friction coefficient and the like. The avoiding time Tca corresponds to time required for avoiding the contact with the preceding vehicle, and is set so that the inclination of the avoiding time Tca is larger in a region where the avoiding steerage amount δ is smaller, and the inclination of the avoiding time Tca is smaller in a region where the avoiding steerage amount δ is larger.

Subsequently, the safety system operation control means M12 calculates a warning timing Tw by adding a margin time dTw to the avoiding time Tca.

$$Tw = Tca + dTw$$

Further, the safety system operation control means M12 calculates a warning distance Dw by multiplying the warning timing Tw by a relative speed ΔV between the subject vehicle V and the preceding vehicle.

$$Dw = Tw \times \Delta V$$

When a relative distance D between the subject vehicle V and the preceding vehicle is equal to or smaller than the warning distance Dw, the warning means 10 is actuated by a command from the safety system operation control means M12 to emit a warning sound or voice to the driver in order to avoid the contact with the preceding vehicle. As a result, the contact with the preceding vehicle is avoided by conducting the steering operation or the braking operation by the driver.

In calculating the warning distance Dw, it is possible to take an acceleration or deceleration of the subject vehicle V or the preceding vehicle into consideration, or to add a predetermined margin distance to the value obtained by multiplying the warning timing Tw by the relative speed ΔV.

The above description is about a case where only one preceding vehicle has been detected, but the following is the description about a case where a plurality of preceding vehicles have been detected.

Figure 8:
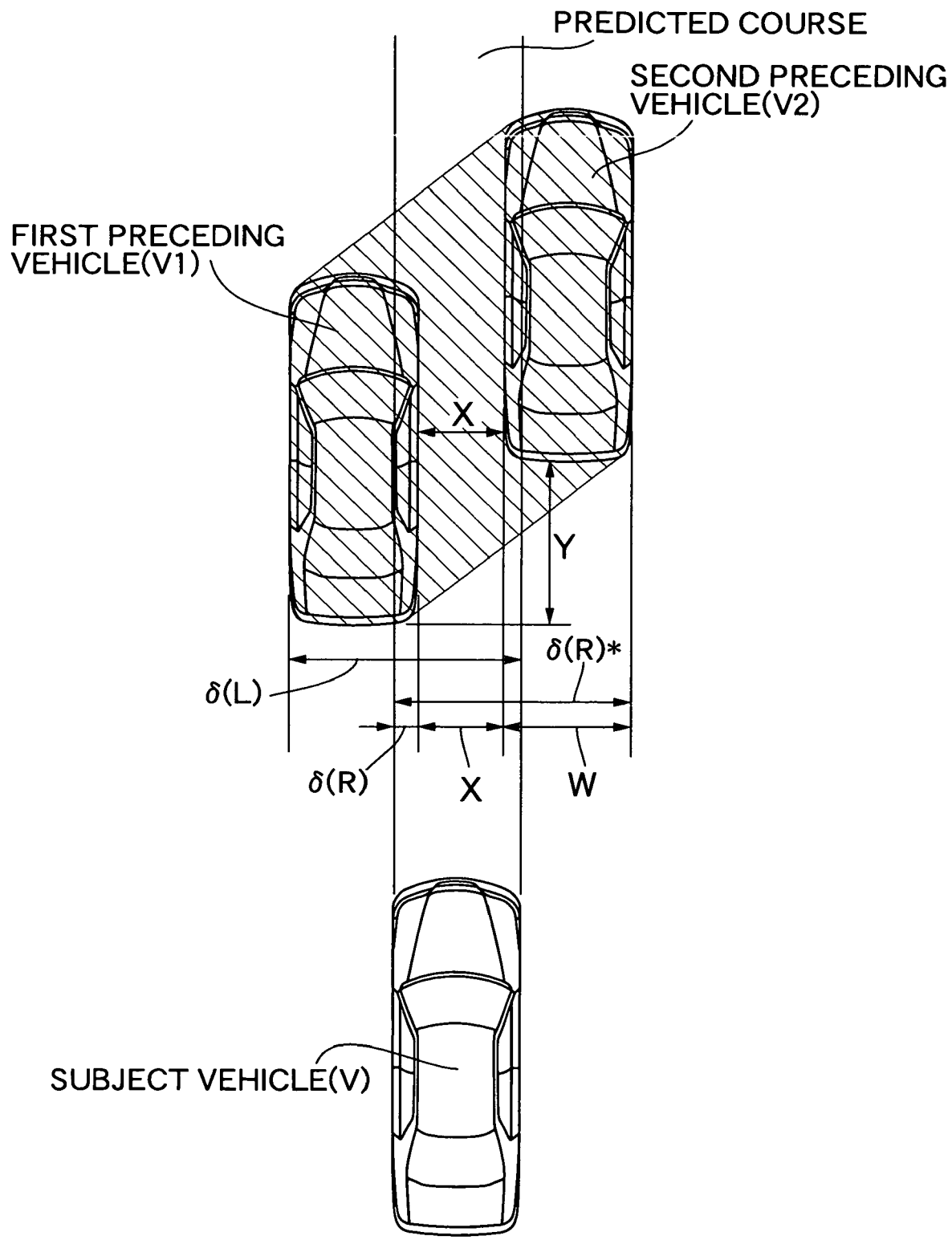

If a first preceding vehicle V1 and a second preceding vehicle V2 exist in a predicted course of the subject vehicle, as shown in FIG. 8, then avoiding steerage amounts δ(L) and δ(R) in lateral directions are calculated for each of the first and second preceding vehicles V1 and V2 by a technique same as that described above. In a case where the first preceding vehicle V1 is considered as a reference, if a distance X from the second preceding vehicle V2 in a direction of width of the subject vehicle V is equal to or smaller than a predetermined value X1 (e.g., 2 m); a distance Y from the second preceding vehicle V2 in a direction of length of the subject vehicle V is equal to or smaller than a predetermined value Y1 (e.g., 5 m), and a relative speed between the first and second preceding vehicles V1 and V2 is equal to or smaller than a predetermined value (e.g., 19 km/hr), then the correlation calculating means M11 determines that the first and second preceding vehicles V1 and V2 are closer to each other, and the subject vehicle V cannot pass through a space between the first and second preceding vehicles V1 and V2.

In this way, by setting the first predetermined value X1 at 2 m which is a value close to the width of the subject vehicle V and setting the second predetermined value Y1 at 5 mm which is a value close to the length of the subject vehicle V, it is possible to properly determine whether or not the subject vehicle V can pass through a space between the first and second preceding vehicles V1 and V2.

The situation where the relative speed between the first and second preceding vehicles V1 and V2 is equal to or smaller than the predetermined value, is a necessary condition for determining the incapability for the subject vehicle V to pass through a space between the first and second preceding vehicles V1 and V2. Therefore, even if the distance between the first and second preceding vehicles V1 and V2 in a direction of length of the subject vehicle V is increased suddenly due to a large relative speed, it is possible to prevent the erroneous determination that the subject vehicle V can pass through a space between the first and second preceding vehicles V1 and V2.

If the first and second preceding vehicles V1 and V2 are close to each other, and the subject vehicle V cannot pass through a space between the first and second preceding vehicles V1 and V2, then the correlation calculating means M11 corrects the avoiding steerage amounts δ(L) and δ(R) calculated for each of the individual preceding vehicles. The correction of the avoiding steerage amounts δ(L) and δ(R) for the first preceding vehicle V1 is shown in FIG. 8. Because the second preceding vehicle V2 situates on the right of the first preceding vehicle V1, the leftward avoiding steerage amount δ(L) of the lateral avoiding steerage amounts δ for the first preceding vehicle V1 is not required to be corrected. However, if an attempt is made for the subject vehicle V to avoid the first preceding vehicle V1 rightwards, then the second preceding vehicle V2 is an obstacle, and hence the avoiding steerage amount δ(R) in the rightward direction, in which the second preceding vehicle V2 exists, is corrected.

The correction of the rightward avoiding steerage amount δ(R) is carried out in the following manner: a value is obtained by adding a distance X between the first and second preceding vehicles V1 and V2 in the direction of the width of the subject vehicle and a width W of the second preceding vehicle V2 to an uncorrected avoiding steerage amount δ(R);

and the value is determined as a corrected avoiding steerage amount δ*(R).

$$\delta^*(R) = \delta(R) + X + W$$

That is, when the subject vehicle V cannot pass through a space between the first and second preceding vehicles V1 and V2, the first and second preceding vehicles V1 and V2 are regarded as one preceding vehicle shown by oblique lines drawn in FIG. 8, to calculate the leftward and rightward avoiding steerage amounts δ(L) and δ(R). Thus, it is possible to avoid the complication of calculation of the avoiding steerage amounts δ(L) and δ(R). In addition, because the distance X between the first and second preceding vehicles V1 and V2 and the width W of the second preceding vehicle V2 are added to the uncorrected avoiding steerage amount δ(R) to calculate the corrected avoiding steerage amounts δ*(L) and δ*(R), the values of these avoiding steerage amounts δ*(L) and δ*(R) are appropriately equal to an actual avoiding steerage amount δ for avoiding the second preceding vehicle V2.

Then, smaller one of the leftward avoiding steerage amount δ(L) requiring no correction and the corrected rightward avoiding steerage amount δ*(R) is determined as a final corrected avoiding steerage amount δ*. In this way, by determining the presence or absence of a possibility of contact based on smaller one of the leftward and rightward avoiding steerage amounts δ(L) and δ(R), it is possible to prevent an erroneous determination that there is a possibility of contact although there is actually no possibility of contact, which would otherwise operate unnecessarily the safety system 11 to give a feeling of discomfort to the driver.

When the corrected avoiding steerage amount δ* is calculated in the above-described manner, the safety system operation control means M12 calculates a warning distance Dw in a manner similar to that described above. Larger one of a relative speed ΔV between the subject vehicle V and the first preceding vehicle V1 and a relative speed ΔV between the subject vehicle V and the second preceding vehicle V2, is used as a relative speed ΔV between the subject vehicle V and the preceding vehicle, thereby calculating the warning distance. Smaller one of a relative distance between the subject vehicle V and the first preceding vehicle V1 and a relative distance D between the subject vehicle V and the second preceding vehicle V2, is used as a relative distance D between the subject vehicle V and the preceding vehicle, and is used for comparison with the warning distance Dw for actuating the warning means 10.

Thus, if a second preceding vehicle V2 exists in the vicinity of a first preceding vehicle V1, an avoiding steerage amount δ in a direction in which the second preceding vehicle V2 exists is corrected. Therefore, it is possible to properly determine the presence or absence of a possibility of contact based on the corrected avoiding steerage amount δ and to inhibit the occurrence of a situation where the subject vehicle V cannot avoid the second preceding vehicle V2 although the subject vehicle V can avoid the first preceding vehicle V1.

In the above description, the correction of the avoiding steerage amount δ and the determination of the presence or absence of the possibility of contact are carried out on the basis of the first preceding vehicle V1, but the same procedure may be carried out on the basis of the second preceding vehicle V2 or a third or subsequent preceding vehicle.

The above example has been described about the case where the warning means 10 is actuated in order to avoid the contact of the subject vehicle with the preceding vehicle. However, if the avoiding operation is not immediately carried out by the driver although the warning means 10 has been actuated, the electronically controlled vacuum booster 2 and the hydraulic pressure control device 4 are actuated by a command from the electronic control unit U to carry out the automatic braking. This automatic braking is carried out when the relative distance D between the subject vehicle V and the preceding vehicle becomes equal to smaller than an automatic braking distance Db corresponding to the above-described relative distance Dw as a result of the comparison between the automatic braking distance Db and the relative distance D.

An avoiding time Tca for calculating the automatic braking distance Db is searched in reference to the map shown in FIG. 7. The map is set so that the avoiding time Tca for calculating the automatic braking distance Db is shorter than an avoiding time Tca for calculating the warning distance Dw. Thus, if there is a possibility that the subject vehicle comes into contact with a preceding vehicle, a warning is first emitted by the warning means 10, and the automatic braking is then carried out by the electronically controlled vacuum booster 2 and the hydraulic pressure control device 4.

A braking force for the automatic braking may be generated equally in the left and right wheels, but the leftward or rightward avoiding operation can be assisted, if a yaw moment for quickly turning the head of the vehicle V is generated in a steering direction by controlling the pressure regulators 6 to increase the braking force for the left front wheel WFL and the left rear wheel WRL or to increase the braking force for the right front wheel WFR and the right rear wheel WRR. Also, the behavior of the vehicle can be prevented from becoming instable even when the road surface friction coefficient is small, if braking forces for the four wheels are individually controlled by the pressure regulators 6 to exhibit an antilock braking function.

In the first reference example, a modification in design can be made as follows.

For example, the safety system 11 is not limited to the warning means 10, the electronically controlled vacuum booster 2 and the pressure regulators 6, and may be another means such as a steerage-assisting means adapted to generate a steering torque in a contact avoiding direction.

The warning means 10 of the safety system 11 is not limited to the speaker and any other means such as a buzzer, a chime, a lamp and LED may be employed.

In the first reference example, when the relative speed ΔV of the first and second preceding vehicles V1 and V2 is equal to or lower than the predetermined value, the avoiding steerage amount δ is corrected. However, when the relative speed ΔV of the first and second preceding vehicles V1 and V2 is in a predetermined range, the avoiding steerage amount 6 may be corrected.

The object and the other object are limited to the preceding vehicles V1 and V2, and may be vehicles traveling in the opposite direction, fixed objects beside a road, dropped objects on a road or the like.

A second reference example will be described below with reference to FIGS. 9 to 12.

Figure 9:
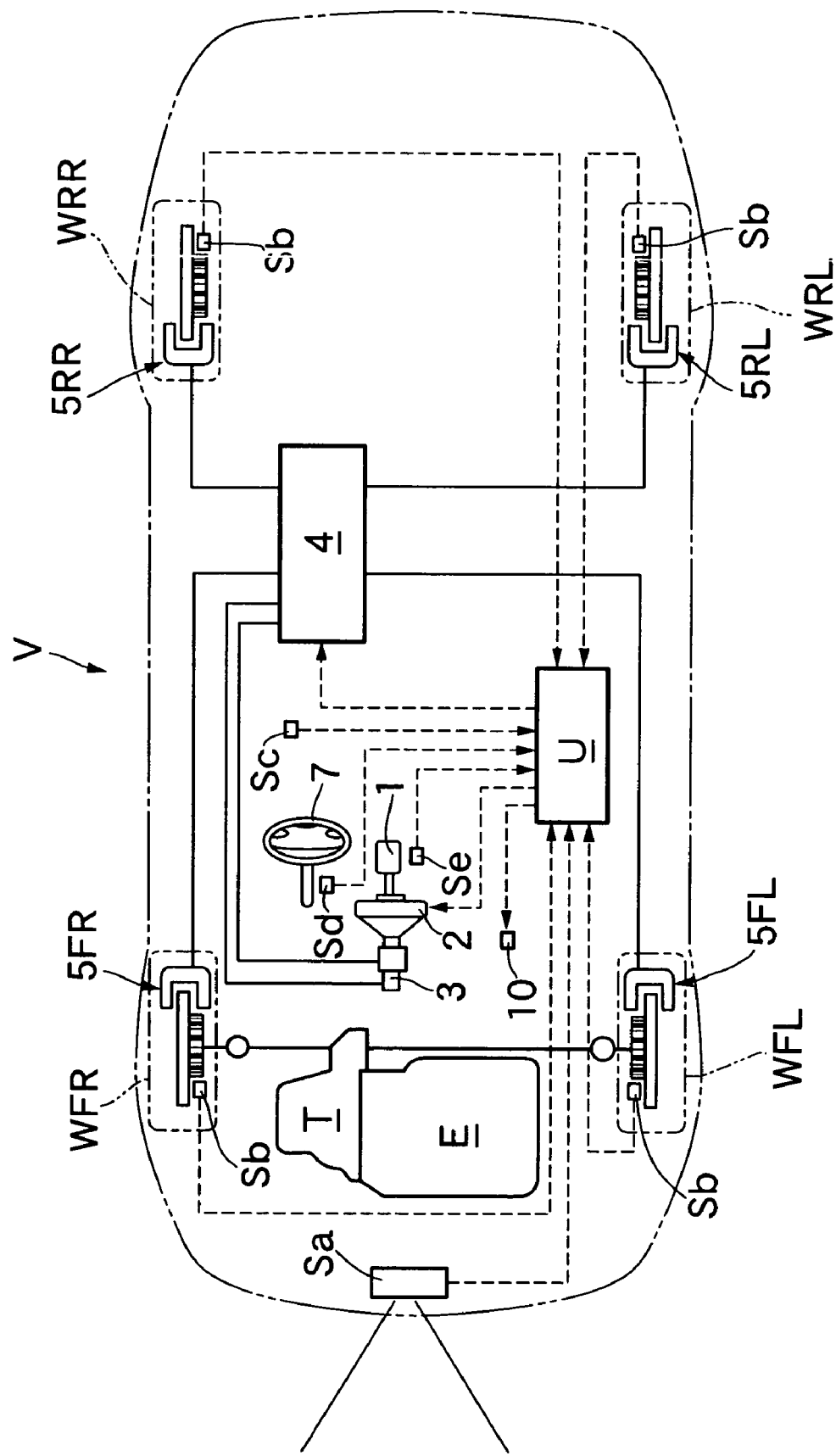
Figure 10:
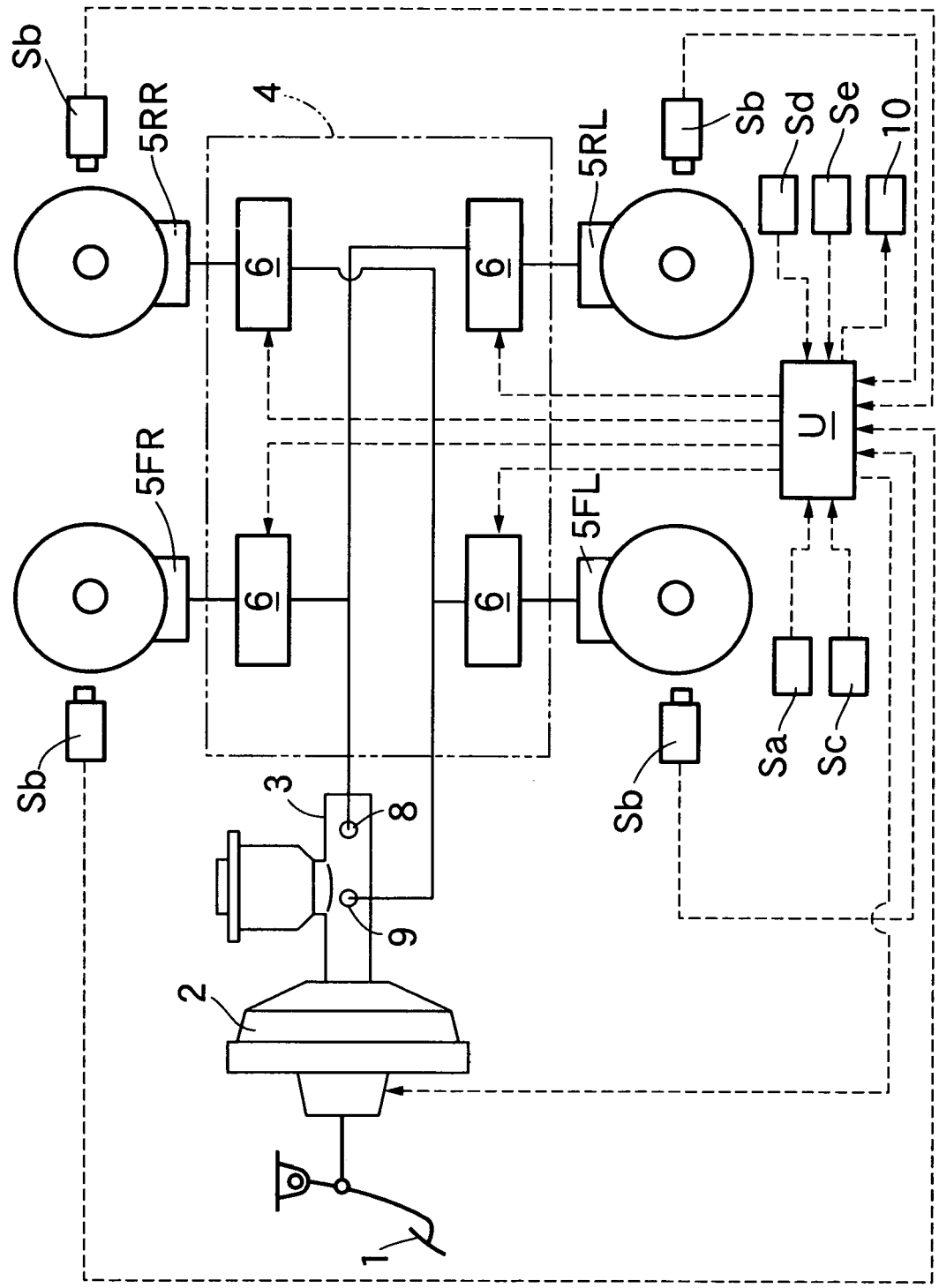
Figure 11:
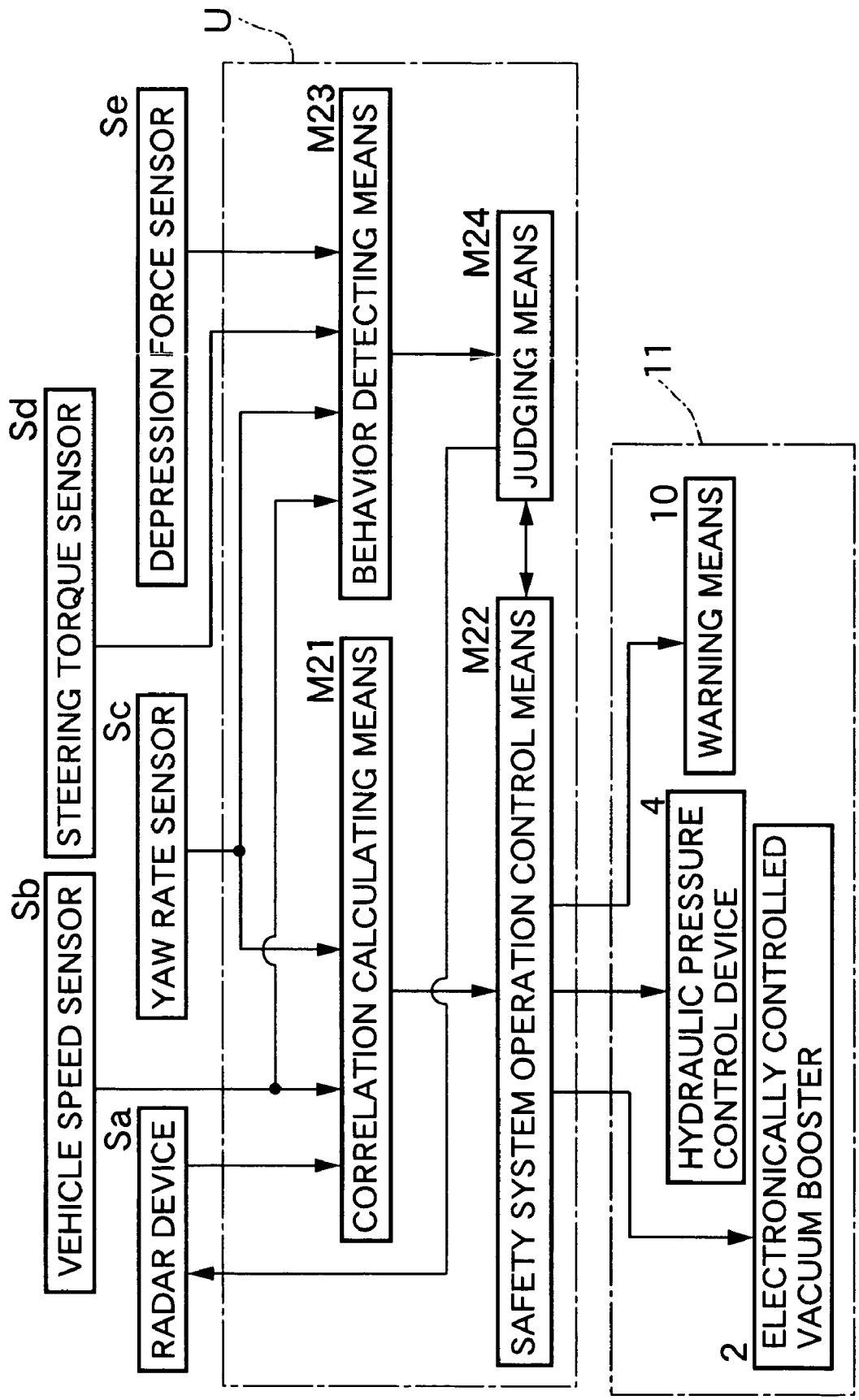

As shown in FIGS. 9 and 10, an electronic control unit U in the second reference example includes a correlation calculating means M21, a safety system operation control means M22, a behavior detecting means M23 and a judging means M24. Connected to the electronic control unit U are a steering torque sensor Sd for detecting a steering torque of a steering wheel 7 and a depression force sensor Se for detecting a depression force applied to a brake pedal, as well as a radar device Sa, vehicle speed sensors Sb and a yaw rate sensor Sc.

The radar device Sa, the vehicle speed sensors Sb and the yaw rate sensor Sc are connected to the correlation calculating means M21. A warning means 10, an electrically controlled vacuum booster 2 and a hydraulic pressure control device 4, which constitute a safety system 11, are connected the safety system operation control means M22 connected to the correlation calculating means M21. The vehicle speed sensors Sb, the yaw rate sensor Sc, the steering torque sensor Sd and the depression force sensor Se are connected to the behavior detecting means M23. The safety system operation control means M22 and the radar device Sa are connected to the judging means M24 connected to the behavior detecting means M23. The arrangement of the other components is the same as that in the above-described embodiment.

Figure 12:
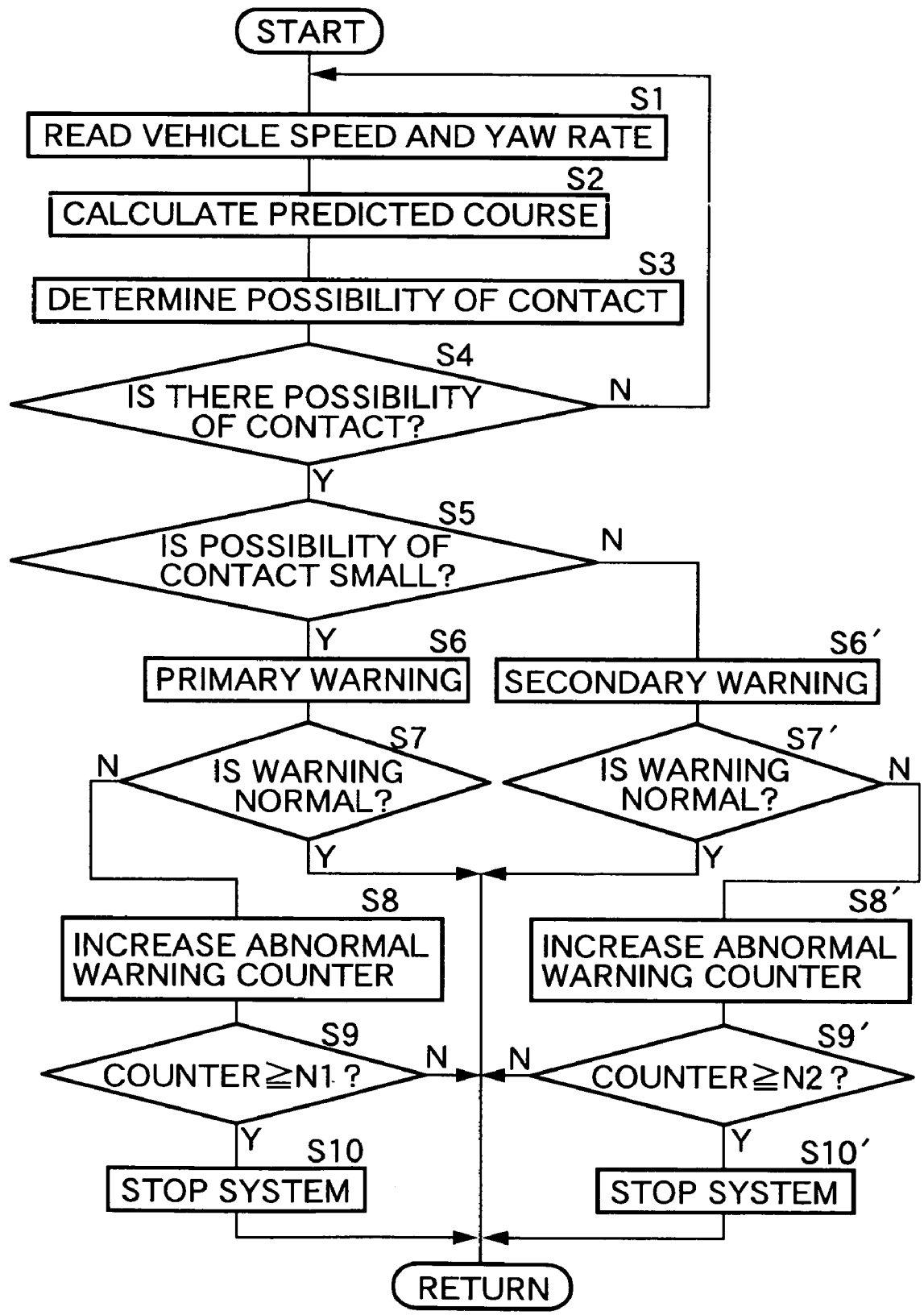

The operation of the second reference example having the above-described arrangement will be described below with reference to a flow chart in FIG. 12.

First, the correlation calculating means M21 of the electronic control unit U reads a vehicle speed detected by the vehicle speed sensors Sb and a yaw rate detected by the yaw rate sensor Sc at Step S, and predicts a future course of a subject vehicle V based on the vehicle speed and the yaw rate at Step S2. A predicted course of the subject vehicle V during straight traveling of the subject vehicle V is straight, but a predicted course during rightward turning of the subject vehicle is curved rightwards, and a predicted course during a leftward turning of the subject vehicle is curved leftwards. The curvature is larger as the yaw rate is larger and as the vehicle speed is smaller if the yaw rate is constant.

At subsequent Step S3, the correlation calculating means M21 calculates a relative position (a direction and a relative distance) and a relative speed of an object such as a preceding vehicle existing in the predicted course of the subject vehicle V, based on an output from the radar device Sa. If the radar device Sa is a millimeter radar device, the relative speed of the object can be immediately determined, and if the radar device Sa is a laser radar device, the relative speed of the object can be determined as a rate of change with time in the relative distance of the object.

Further, at Step S3, the safety system operation control means M22 determines the presence or absence of a possibility that the subject vehicle V comes into contact with the preceding vehicle V1, based on the relative position and the relative speed. If there is a possibility of contact at Step S4, then the magnitude of the possibility of contact is determined at Step S5. More specifically, when a preceding vehicle V1 exists in the predicted course of the subject vehicle V, and a time T ($=\Delta L/\Delta V$) before the contact obtained by dividing a relative distance $\Delta L$ to the preceding vehicle V1 by a relative speed $\Delta V$ is smaller than a first larger predetermined value T1, namely, when the possibility of contact is lower, the safety system operation control means M22 actuates the warning means 10 to output a primary warning at Step S6. When the time T ($=\Delta L/\Delta V$) before the contact is smaller than a second smaller predetermined value T2, namely, when the possibility of contact is higher, the safety system operation control means M22 actuates the warning means 10 to output a secondary warning at Step S6'.

The magnitude relationship between the first and second predetermined values T1 and T2 is such that T1>T2. When the time T before the contact is smaller than the first larger predetermined value T1, the possibility of contact is lower, and the degree of emergency is lower. When the time T before the contact is smaller than the second smaller predetermined value T2, the possibility of contact is highger, and the degree of emergency is higher.

For the primary warning in the second reference example, the warning means 10 is actuated to emit a warning sound, and for the secondary warning, the electronically controlled vacuum booster 2 and the hydraulic pressure control device 4 are actuated to generate a weak braking force as the warning. In whichever case, the purpose is to warn the driver of the presence of the possibility of contact with the preceding vehicle to urge the driver for the spontaneous braking or steering operation for avoiding the contact.

When the primary or secondary warning is emitted in this manner, the behavior detecting means M23 and the judging means M24 determine at Steps S7 and S7' whether or not the warning is a normal warning.

If the behavior detecting means M23 has detected at Step S7 that the driver has not conducted the braking operation or the steering operation for avoiding the preceding vehicle V1 when $\Delta T1$ has been lapsed during a period from the emission of the primary warning to the emission of the secondary warning (T1<T1+$\Delta T1$<T2), namely, if the steering torque sensor Sd has not detected that the driver has operated the steering wheel 7 with a steering torque equal to or larger than a predetermined value and the depression force sensor Se has not detected that the driver has depressed the brake pedal 1 with a strength equal to or larger than a predetermined value, then the judging means M24 determines that the primary warning is an abnormal warning rather than a normal warning.

This is because if a normal primary warning has been emitted, the driver must have conducted the steering operation or the braking operation in order to avoid the contact with the preceding vehicle V1. The reason why the steering operation or the braking operation has been not conducted is that the primary warning has been not emitted; or although the primary warning has been emitted, the driver has determined it unnecessary to conduct the braking operation or the steering operation for avoiding the contact, regarding the warning as an abnormal warning to ignore it. Therefore, the time $\Delta T1$ is required to be set as time enough for the driver to operate the steering wheel 7 or the brake pedal 1 after the emission of the primary warning.

Likewise, if the behavior detecting means M23 has detected at Step S'0 that the driver has not conducted the operation for avoiding the preceding vehicle V1 when $\Delta T2$ has been lapsed after the emission of the secondary warning, namely, if the steering torque sensor Sd has not detected that the driver has operated the steering wheel 7 with a steering torque equal to or larger than the predetermined value and the depression force sensor Se has not detected that the driver has depressed the brake pedal 1 with a strength equal to or larger than the predetermined value, then the judging means M24 determines that the secondary warning is an abnormal warning rather than a normal warning.

It is desirable that the time $\Delta T2$ after the secondary warning is shorter than the time $\Delta T1$ after the primary warning. The reason is that the secondary warning should be emitted when the possibility of contact is larger, and hence an early determination is required.

When the primary warning or the secondary warning has been determined as the abnormal warning in the above-described manner, an abnormal warning counter is increased in an increment of 1 at steps S8 or S8', and when the counting number provided by the abnormal warning counter is equal to or larger than N1 or N2 at Steps S9 or S9', the operations of the radar device Sa and the safety system operation control device M22 are stopped, whereby the further abnormal warning is prevented from being emitted.

In the second reference example, a threshold value N1 for the counting number provided by the abnormal warning counter for the primary warning is 10, and a threshold value N2 for the counting number provided by the abnormal warning counter for the secondary warning is 3. In this manner, the system is stopped when the abnormal warning is detected plural times. Therefore, when the drover does not conduct the contact avoiding operation, because the possibility of contact has been eliminated by the sudden acceleration of the preceding vehicle V1, it is possible to eliminate a disadvantage that the abnormal determination is immediately conducted to stop the system. The reason why the threshold value N2 for the secondary warning is set smaller than the threshold value N1 for the primary warning is that it is necessary to stop the system early, when the secondary warning emitted when there is a large possibility of contact is an abnormal warning.

The abnormal warning counter is reset to 0, when an ignition switch is turned on, and the abnormal warning counter counts up the counting number, until the ignition switch is turned off. Even if a normal determination is conducted during counting, the counting number cannot be changed by this. The system can be also stopped immediately when the avoiding operation conducted by the driver is not detected although the secondary warning is emitted continuously for several seconds (e.g., 2 to 3 seconds). This determining condition is an OR condition in a determining condition for stopping the system when the counting number for the abnormal warning is equal to or larger than N2. Namely, when any one of these conditions is established, the system is stopped.

In the second reference example, it is determined, based on the outputs from the steering torque sensor Sd and the depression force sensor Se, whether the driver has conducted the contact avoiding operation after the primary and secondary warnings, but this determination may be conducted based on the outputs from the vehicle speed sensors Sb and the yaw rate sensor Sc. This is because when the driver conducts the braking operation for the purpose of avoiding the contact, the vehicle speed detected by the vehicle speed sensors Sb is reduced, and when the driver conducts the steering operation for the purpose of avoiding the contact, the yaw rate detected by the yaw rate sensor Sc is increased.

In the second reference example, the modifications in design as described below may be made:

For example, the primary warning and the secondary warning are not limited to the warning sound emitted by the warning means 10, and the generation of the weak braking force by the electronically controlled vacuum booster 2 and the hydraulic pressure device 4, and a sound or light by a buzzer, a chime, a lamp, LED or the like may be employed, or a means for vibrating the steering wheel 7 or other means may be employed.

The steering operation conducted by the driver may be detected by a known steering angle sensor (not shown) in place of the steering torque sensor Sd. In this case, it is possible to detect that the driver's steering operation has been conducted by detecting through the steering angle sensor a change in steering angle equal to or larger than a predetermined value or a steering angle speed equal to or larger than a predetermined value.

It is also possible to carry out, in place of the primary warning and the secondary warning, the primary braking and the secondary braking each comprising an automatic braking in which the electronically controlled vacuum booster 2 and the hydraulic control device 4 are operated, and to carry out the primary steering and the secondary steering each comprising an automatic steering in which an actuator of an electrically power steering device is operated to avoid the contact. In these operations, a braking force for the secondary braking is set stronger than a braking force for the primary braking, and a steering torque for the secondary steering is set stronger than a steering torque for the primary steering.

When the automatic braking or the automatic steering is carried out, if the steering torque sensor Sd detects the steering operation for avoiding the contact or the depression force sensor Se detects the braking operation for avoiding the contact within a predetermined time in both cases, as a result of the primary and second braking operations or primary and secondary steering operations carried out, it can be determined that a normal automatic braking or a normal automatic steering has been carried out. In the above-described determination, the outputs from the vehicle speed sensors Sb and the yaw rate sensor Sc can be used in place of the outputs from the steering torque sensor Sd and the depression force sensor Se. This is because if the driver conducts the braking operation after the start of the automatic braking, the vehicle speed sensors Sb detect a deceleration exceeding a deceleration provided by the automatic braking, and if the driver conducts the steering operation after the start of the automatic steering, the yaw rate sensor Sc detects a yaw rate exceeding a yaw rate provided by the automatic steering.

It is also possible to combine the primary warning conducted by a sound or light with the secondary braking comprising the automatic braking or the secondary steering comprising the automatic steering.

In addition, the automatic braking is not limited to the hydraulic braking and may be an engine brake. In this case, the transmission can be downshifted by one stage by the primary braking and downshifted by two stages by the secondary barking.

Further, the object mentioned in the present invention is not limited to the preceding vehicle V1 and may be a vehicle existing or traveling in the opposite direction, a fixed object beside a road, a dropped object on a road or the like.

What is claimed is:

1. A travel safety system for a vehicle, comprising:
   an object detecting means for detecting an object existing in a travel direction of the vehicle;
   a correlation calculating means for calculating a correlation including a relative position of the object to the vehicle based on a result of the detection by the object detecting means;
   a safety device comprising a primary warning means, and a secondary warning means, wherein the secondary warning means is actuated when a possibility of the vehicle contacting the object is higher than that needed for operation of the primary warning means; and
   a safety device operation control means for determining presence or absence of a possibility of contact between the vehicle and the object based on the correlation calculated by the correlation calculating means, and controlling the operation of the safety device,
   wherein the safety device operation control means actuates the primary warning means when a duration of time for which the object exists in a primary predetermined region where there is the possibility of contact with the vehicle is equal to or larger than a primary predetermined period, and actuates the secondary warning means when a duration of time for which the object exists in a secondary predetermined region where there is the possibility of contact with the vehicle is equal to or larger than a secondary predetermined period, and
   wherein the primary predetermined period is longer than the secondary predetermined period.

2. A travel safety system for a vehicle according to claim 1, further comprising a course predicting means for predicting a future course of the vehicle based on a motional state of the vehicle;

wherein the correlation calculating means calculates an overlap amount in a vehicle-width direction in which the object is situated in the predicted future course; and wherein the safety device operation control means construes that the object exists in the predetermined region when the overlap amount is equal to or larger than a predetermined value.

3. A travel safety system for a vehicle, comprising:

an object detecting means for detecting an object existing in a travel direction of the vehicle;

a correlation calculating means for calculating a correlation including a relative position of the object to the vehicle based on a result of the detection by the object detecting means;

a safety device comprising a primary decelerating means, and a secondary decelerating means, wherein the secondary decelerating means is actuated when a possibility of the vehicle contacting the object is higher than that needed for operation of the primary decelerating means;

a safety device operation control means for determining presence or absence of the possibility of contact between the vehicle and the object based on the correlation calculated by the correlation calculating means, and controlling the operation of the safety device, wherein the safety device operation control means actuates the primary decelerating means when a duration of time for which the object exists in a primary predetermined region where there is the possibility of contact with the vehicle is equal to or larger than a primary predetermined period, and actuates the secondary decelerating means when a duration of time for which the object exists in a secondary predetermined region where there is the possibility of contact with the vehicle is equal to or larger than a secondary predetermined period, and wherein the secondary predetermined period is longer than the primary predetermined period.

4. A travel safety system for a vehicle, comprising:

an object detecting means for detecting an object existing in a travel direction of the vehicle;

a correlation calculating means for calculating a correlation including a relative position of the object to the vehicle based on a result of the detection by the object detecting means;

a safety device comprising a primary steering means, and a secondary steering means, wherein the secondary steering means is actuated when a possibility of the vehicle contacting the object is higher than that needed for operation of the primary steering means;

a safety device operation control means for determining presence or absence of the possibility of contact between the vehicle and the object based on the correlation calculated by the correlation calculating means, and controlling the operation of the safety device, wherein the safety device operation control means actuates the primary steering means when a duration of time for which the object exists in a primary predetermined region where there is the possibility of contact with the vehicle is equal to or larger than a primary predetermined period, and actuates the secondary steering means when a duration of time for which the object exists in a secondary predetermined region where there is the possibility of contact with the vehicle is equal to or larger than a secondary predetermined period, and wherein the secondary predetermined period is longer than the primary predetermined period.

5. A travel safety system for a vehicle, comprising:

an object detecting means for detecting an object existing in a travel direction of the vehicle;

a correlation calculating means for calculating a correlation including a relative position of the object to the vehicle based on a result of the detection by the object detecting means;

a safety device comprising a primary warning means, a secondary warning means, a primary decelerating means and a secondary decelerating means, wherein the secondary warning means is actuated when a possibility of the vehicle contacting the object is higher than that needed for operation of the primary warning means, and wherein the secondary decelerating means is actuated when the possibility of the vehicle contacting the object is higher than that needed for operation of the primary decelerating means; and a safety device operation control means for determining presence or absence of a possibility of contact between the vehicle and the object based on the correlation calculated by the correlation calculating means, and controlling the operation of the safety device, wherein the safety device operation control means calculates a primary warning timing, a secondary warning timing, a primary braking timing and a secondary braking timing and control is carried out in an order of: a primary warning, a secondary warning, a primary braking and a secondary braking, from the longer timing operation to the shorter timing operation, wherein the safety device operation control means actuates the primary warning means when a duration of time for which the object exists in a primary predetermined region where there is the possibility of contact with the vehicle is equal to or larger than a primary predetermined period, and actuates the secondary warning means when a duration of time for which the object exists in a secondary predetermined region where there is the possibility of contact with the vehicle is equal to or larger than a secondary predetermined period, and actuates the primary decelerating means when a duration of time for which the object exists in a thirdly predetermined region where there is the possibility of contact with the vehicle is equal to or larger than a thirdly predetermined period, and actuates the secondary decelerating means when a duration of time for which the object exists in a fourthly predetermined region where there is the possibility of contact with the vehicle is equal to or larger than a fourthly predetermined period, wherein the primary predetermined period is longer than the secondary predetermined period, and wherein the fourthly predetermined period is longer than the thirdly predetermined period.

* * * * *